March 15, 1955 J. L. SOLOMON 2,704,303

SYSTEMS OF COLORATION FOR VIDEO TRANSMISSION

Filed April 24, 1950 2 Sheets-Sheet 1

Inventor
Julius L. Solomon
By Pollock & T. H. Marks
Attorneys

March 15, 1955 J. L. SOLOMON 2,704,303

SYSTEMS OF COLORATION FOR VIDEO TRANSMISSION

Filed April 24, 1950 2 Sheets-Sheet 2

Inventor
Julius L. Solomon
By Kollonst Homarks
Attorneys

United States Patent Office 2,704,303

Patented Mar. 15, 1955

2,704,303

SYSTEMS OF COLORATION FOR VIDEO TRANSMISSION

Julius L. Solomon, Chicago, Ill.

Application April 24, 1950, Serial No. 157,821

6 Claims. (Cl. 178—5.2)

The present invention relates to methods of and apparatus for color filtering having particular application to video picture transmitting and receiving station apparatus and is characterized by the utilization of a single picture tube element in the attainment of polychromatic sequences according to various systems of resolution.

The introduction of color into conventional television practice encounters numerous fundamental difficulties which are additional to the ones that beset other forms of motion picture or still picture coloration. While adhering to the basic concept of synthetic composition from elementary filter colors of few number, the characteristics of video picture tube portrayal are quite different from those of print or film projection. Most prominent among such are probably the results of field distortions because picture screen images of video tubes are continuously in a state of motion so that direct superimposition from several tube sources constitutes an attempt to reconcile infinite distortion factors many of which may be the result of local influences of a transient character and which will produce instantaneous differences even among the most closely balanced scanning systems. Superimposition, therefore, from several image sources onto a common collector field as has been achieved with some degree of success in the motion picture art may not be relied upon in television systems to endure beyond transitory chance intervals that are free from the various factors of signal disturbance.

The herein proposed system of color analysis, recognizing these and other inherent factors of misalignment, consists in the utilization of certain new elementary components which make it possible to derive a basic picture outline from a single image source so that those signal disturbances, which manifest irregularities in the picture outline and which otherwise produce distortion effects due to local influences, may not inflict further deterioration upon the final picture portrayal because of color overlap or fringe effects. Under the present plan, the reassembling of the picture components or the synthesis of the elementary colors is reproduced within object outlines which are continuously identical whether true or distorted in respect to the object details. Moreover, any outline variations due to signal disturbance or other factors stemming as they do from a single object stimuli remain identical instant for instant as the motion in the picture changes.

Another feature inherent in the proposed system is its adaptability to various different modes of color sequencing as these trends have already developed under existing variations of practice. Monitoring of color change is a function which may be very conveniently modified or adjusted so as to procure changes at dot frequencies, scanning line frequencies, or full picture frame frequencies which are the three alternatives mentioned according to prevailing variations of practice. Further, the present system is admirably reconcilable for use with systems where the basic picture outline provides ideal black and white reception signals so that non-color receivers are not subjected to any deterioration factors but instead, may receive a full quality portrayal in terms of every sense of picture detail.

Briefly stated, this invention contemplates the use of a system of filter mirrors which resolve a principal projection into three componentials that are diverted over separate paths. In each of these paths, there is disposed an ultra-high frequency shutter apparatus that is tied into a system of sequencing established by predetermined selection in accordance with one or another of color change frequencies such as the three already discussed or others. The diverted projections are then reassembled by a converse arrangement of projection mirrors or by any other reconcentration projection whereupon there is produced on the collector field an image that embodies successive color fragmentation at such a frequency as will produce in the retina of the human eye, because of its retarded sensory effect, the illusion of stable color continuity.

Picture transmission is achieved through the use of potentially variable minute signal impulses transmitted under conditions of ultra-high frequency, there being accomplished under established practices ranges in excess of 16,000 impulses per second, the action of a shutter device which will lend itself to the dot frequency order of control must necessarily be one not impaired by physical mass or inertia so as to be adequately responsive to this requisite order of speed. For this reason, there has been adapted to the herein disclosed systems of operation, shutter devices that are constructed on the principle of the Kerr cell coupled with light-polarizing screens placed fore and aft so that traversing light rays which are normally under total obstruction on account of the placement of the polarizing screen elements, are caused to be elliptically rotated under the electrostatic phenomenon of the Kerr cells whereby to cause such rays to pass the screen barriers at certain instantaneous intervals according to the plan of sequencing.

A principal object of the present invention, therefore, is one of accomplishing color filtration from a single cathode ray screen picture source whereby subsequent synthesis of the coloration elements will partake of identical distortion factors where and to the extent that they may occur in video transmission.

Another object of the present invention is to achieve color filtration in a video transmission system which may be made adaptable to any of several different methods of color splicing or filter composition.

Another object of the present invention is to devise a sequencing arrangement for a multiple system of color paths which is capable of being coupled to and synchronized with an ultra-high frequency order of signal transmission.

These and other objects which the present invention seeks to accomplish will now be explained and discussed with particular reference to the following detailed specification and illustrated in the accompanying drawings, in both of which, like reference numerals designate corresponding parts throughout, and in which.

Figure 5:
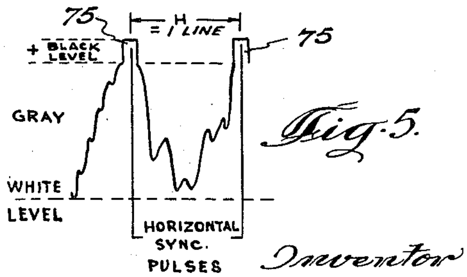
Figure 6:
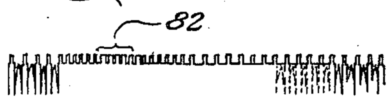

Fig. 5 is a fragmentary curve chart illustrating a typical video scanning signal of a single line duration and its associated horizontal synchronizing pulses; and Fig. 6 is a fragmentary curve chart showing a series of vertical synchronizing pulses according to conventional practice such as may be employed in accordance with the present invention where sync regulation is to be performed under full picture frame sequence of color change.

Figure 1:
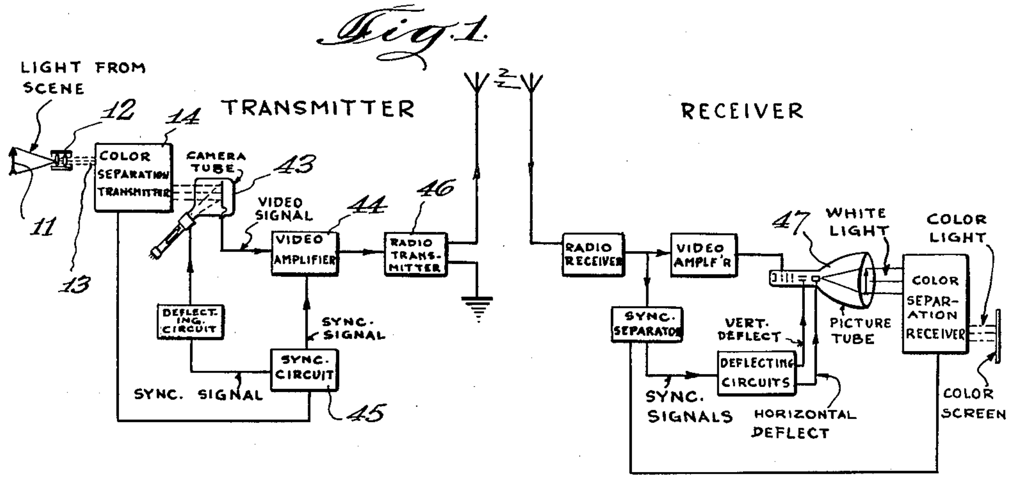
Fig. 1 is a block diagram of a complete transmitting and receiving video system showing generally how the present improvements may be incorporated therein.

In the diagrammatic portrayal of Fig. 1 there is disclosed the general layout of a conventional transmitter-receiver system according to a typical one among several current methods of operation. In such an arrangement, the objective field 11 is viewed through a system of lenses 12 designed to project the converging light rays into a beam of parallel or closely parallel rays 13 which enter into the color analysis unit 14, encountering an oblique alignment of semi-transparent reflecting mirrors 15, 16 and 17, see particularly Fig. 2. These mirrors 15–17 may be clear glass reflectors or they may be endowed with color filter characteristics so that in addition to performing as 90° reflectors of some light rays and penetrable transparencies for others, they may also at this stage in the system, introduce the chromatic variation according to the elementary colors of blue, green and red, causing the separate projection paths 18, 19 and 21 to carry pictorial rays modified by their chromatic characteristics towards the collector mirrors 22, 23 and 24.

Interposed in the path of the separated rays 18, 19 and 21 are a corresponding series of shutters generally indicated 25, 26 and 27, each one of which is comprised of a pair of significantly spaced polaroid films 28 and 29 between which is disposed a transparent container cell 31 filled with a suitable liquid which possesses the characteristic of angular or elliptical light refraction, that is to say, the characteristic which imparts an elliptical polarization to traversing light rays after the manner well recognized by the Kerr observations in electro optics. A typical one of such liquids is nitro-benzene. It is understood, of course, that since the angle polarization in various liquids may vary under given electro-static charges, the distance between the polaroid planes 28 and 29 is to be so prearranged that in the absence of any deflection by the cell 31, the effect of the polarizing planes 28 and 29 will be to totally obscure all light rays, a condition which is obtainable by aligning these members so that their ray passing stratification is disposed at 90° or less one from the other. The Kerr characteristics to be performed by the cell 31 under electrostatic charge is therefore to be of an order which will produce a proper rotation of the light rays which pass through screen 28 whereby such rays will lie parallel with the stratification of screen 29. During an instant of non-energization, therefore, the Kerr cell 31 will remain ineffectual and will permit the light rays passing through the normal place of screen 28 to be supplementarily barred by the disposition of the polaroid screens 29.

The angular or so called elliptical polarization characteristic of the Kerr cell is a function of density as well as of magnitude of the electrostatic charge which is impressed across the electrodes 33—34 of each cell. This characteristic is known to vary in accordance with different kinds of cell fluids.

The projected image is separated by the reflection mirrors 15, 16 and 17 into the three component projections designated 18, 19 and 21 which are then reflected towards collector mirrors 22, 23, and 24, and thereafter reassembled on a common screen 42. Each of the separate or secondary paths 18, 19, and 21 encounters a pair of polarizing screens 28 and 29 of which the stratum lines are perpendicular to one another so as to constitute together a total light barrier. The screens 28 and 29 are significantly spaced one from the other and between them is disposed a Kerr cell element 75 designed for electrical regulation according to a sequence plan which will later be described. Color characteristic variations are imparted to the three component light paths preferably in the elementary order although not necessarily in the sequence of blue, green, and red. The Kerr cells 25, 26, and 27 are controlled through electrostatic impulses of minute duration delivered in a sequential order and in Figs. 2 and 3 the manner of this accomplishment is designated in a symbolic form consisting of a rotary consequence switch 35 whose wiper 36 impresses an electric potential from a battery source 37 over one or another of the wiper segment conductors 38, 39 and 41.

Figure 4:
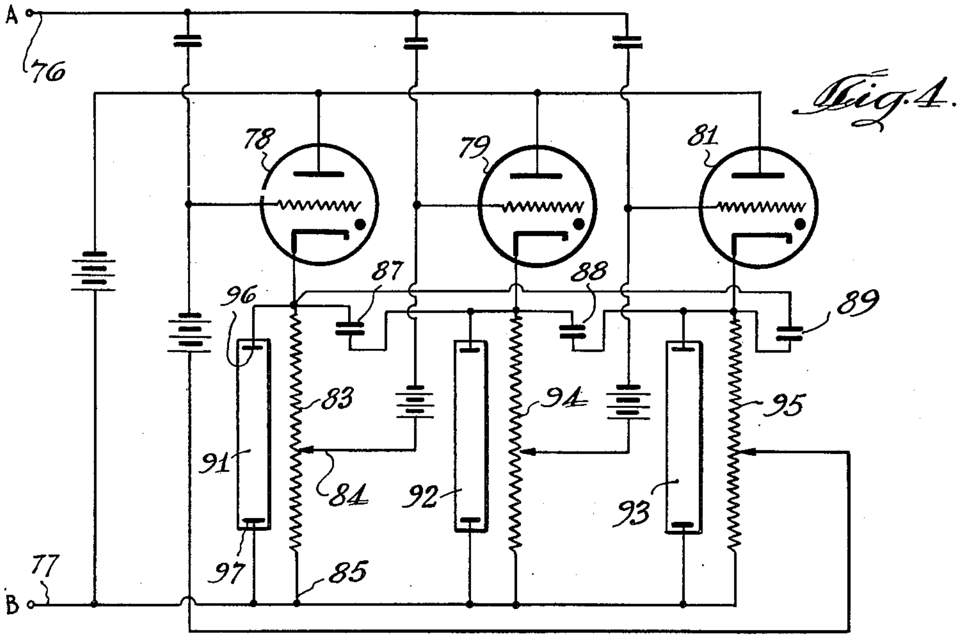
Fig. 4 is a circuit diagram of an electronic sequencing device capable of controlling the Kerr cell shutters at a frequency response consistent with prevailing video signal transmission.
Figure 2:
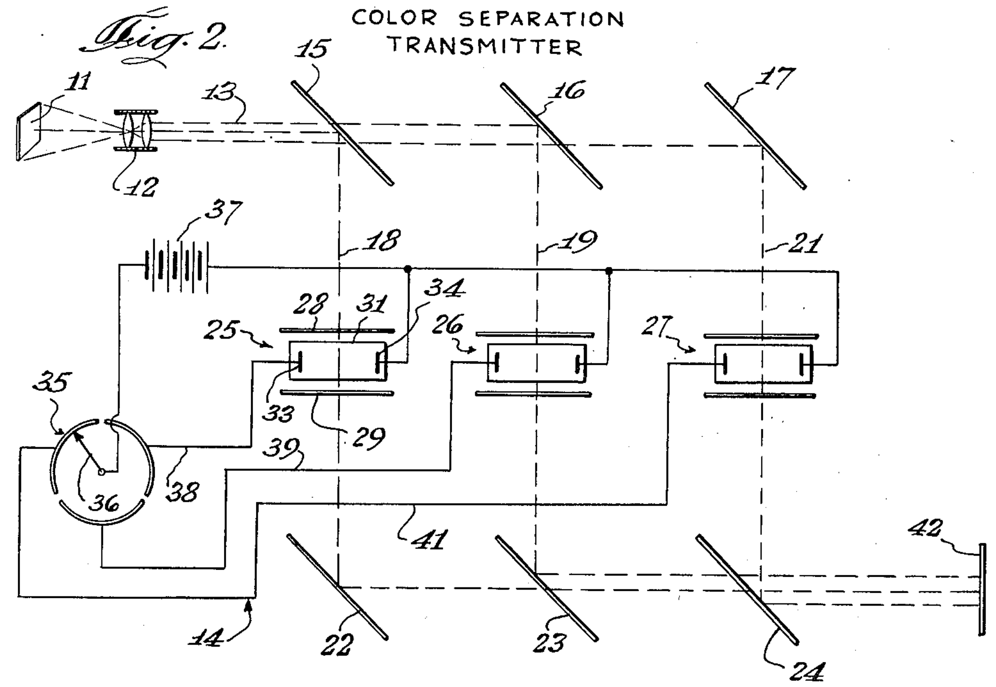
Fig. 2 is a diagrammatic circuit and apparatus symbol disclosure of the transmitter color filtering system showing how the video picture rays may be modified in accordance with various sequencing plans.

It is only during the brief intervals of these electrostatic charges that one or another of the Kerr cells permits its image beam to pass through both polaroid screens 28 and 29 and be reflected preferably in a 90 degree direction as indicated in Fig. 2 to an object screen 42. Since the frequency of the intervalic succession during which the Kerr cells thus perform is in the ultra high frequency order, the collected ultimate image on screen 42 consists of successions of different color fragments flashing, at a speed of change well in excess of the image retention characteristics of the human eye, and the result thus achieved is a colored picture made up of all of the color variations that is retained by the human sensory system as a continuous effect. In practice, of course, the sequencing device 35 in order to perform at the speed requisite in accordance with video signalling will require to have an inertialess performance such as may not be attained by mechanical sequencing devices. Accordingly there is shown in Fig. 4 an electronic system for executing and maintaining the timing cycle.

The color impressed image produced on screen 42 is then projected on to a camera tube 43, Fig. 1, which is equipped with the conventional scanning apparatus after the manner practiced in black and white video transmission. The signals thus generated pass through an amplifier 44, receiving synchronizing impulses under the supervision of a synchronizing circuit 45. The completed video signals are then issued from the radio transmitter 46 as ultra-high frequency ether waves impressed with color density variations.

Figure 3:
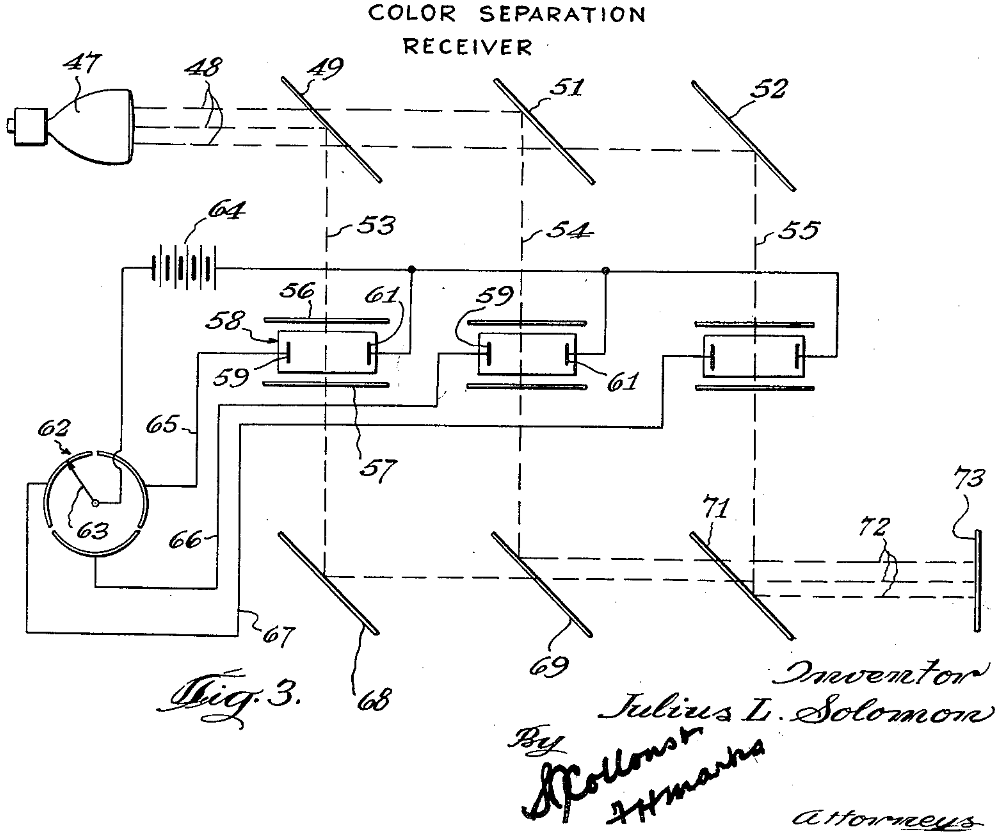
Fig. 3 is a diagrammatic circuit and apparatus symbol disclosure of the receiver color filtering system showing how the signal reception is modified in accordance with various sequencing plans.

At the receiver the incoming signals are amplified in the conventional manner and demodulated, whereafter, under the control of a receiving system synchronizing circuit, they are made to reproduce an image on a standard video projector picture tube 47, see also Fig. 3.

The true voltage of this projection is preferably of a sufficiently high order to produce an adequately brilliant image that may be projected directly as shown in Fig. 3 or through a system of lenses to effect parallel rays 48 which encounter a system of reflecting mirrors designated 49, 51 and 52. These mirrors like the ones 15, 16 and 17 at the transmitter station are disposed at an angle and are possessed of light permeable characteristics as a result of which they produce three reflected image paths 53, 54 and 55. In each one of the image paths is disposed a pair of polaroid screens 56 and 57 as well as an intervening Kerr cell 58 equipped with electrodes 59 and 61.

The sequencing device 62 having a wiper 63 so illustrated for the sake of simplicity is designed to impress a momentary potential from a source 64 across the electrodes 59—61 over one of the circuit lines 65, 66 and 67.

As a consequence the separate light paths 53, 54 and 55 are made to become light-penetrable during an individual instant of a sequence cycle projecting a momentary image on the collector mirror related thereto of the several mirrors designated 68, 69 and 71.

As with the case of the collector mirrors 22–24, the mirrors 68–71 are light-penetrable so that their reflected images are again aligned in parallel rays 72 for projection onto the final picture screen 73 where to the human eye with its characteristic lingering image impression the resultant composition will appear to be a continuous picture portrayal possessed of a full range of color characteristics composited from the three elementary or primary colors blue, green and red.

It has been said that color sequencing according to prevalent and well established practices under alternative methods of analysis are performed at change frequencies of principal classes sometimes referred to as; dot sequence, viz., each horizontal line which comprises a picture, may be made up of a succession of color changes consisting, for example, of from 200 to 250 dots or line parts; or line sequences, by which is meant that successive lines are made up of different colors; or field sequences, by which is meant that a full picture area is composed of one of the primary colors after which a succeeding full picture field or area is composed of a second color and thereafter a third picture field area of the third color, etc.

The present system of color analysis may be operated to agree with any of the three color change systems now practiced or in accordance with other systems which are amenable to the human eye characteristics of image retention. Frequency regulation is a function which may be controlled by the same synchronizing methods that are now employed in black and white transmission for scanning supervision thus as indicated in Fig. 5 the synchronizing impulses 75 which occur at line frequency and occur beyond the black level range may be made to pulse a sequence switch such as the electronic system shown in Fig. 4 by being impressed upon the control points 76 and 77.

As will now be described, the occurrence of an impulse within the responsive range of the control circuit at these points will produce a switching effect in a ring system of gaseous thyratron tubes 78, 79, and 81. When change frequency is to be regulated at full picture interval successions, the vertical synchronizing pulses of Fig. 6 designated 82 are made to produce a firing pulse which is impressed across the terminals 76 and 77 in like manner. Alternatively, when frequency change is to be made at each dot, the stimuli across terminals 76 and 77 may be received from pinpoint intervals of signal potential.

A switching system shown in Fig. 4 will now be described in connection with its manner of operation. At a time when tube 78 is firing, a voltage drop exists across its related resistor 83. A section of resistor 83 lies in the grid cathode circuit of tube 79 which also contains in series a polarizing battery whose negative terminal is connected to the grid side. Tube 81 and 78 have similar polarizing batteries in their respective grid circuits functioning in connection with their respective Kerr cells in similar manner.

Tube 78 under the present contemplation is considered as firing so that its grid no longer controls its current flow and accordingly tube 81 will come to have impressed upon its grid the full potential of the polarizing battery since at this instant there prevails no current through or voltage drop across resistor 94.

The grid voltage of tube 79 is less negative than the voltage on the grid of the tubes 81 and 78 by an amount equal to the voltage drop across the lower section of resistor 83, namely from the slider 84 to the point 85. The impulse response level at points 76 and 77 is preferably so regulated as to override the grid voltage of tube 79 but not enough to override the grid voltage of tube 81. The occurrence of an impulse across terminals 76—77 will then render tube 79 conductive. Capacitor 87 which has been charged by the voltage drop across resistor 83, has its positive side connected to the cathode of tube 78. When thereafter tube 79 becomes conductive, the positive end of capacitor 87 is connected through tube 79 to the anode of tube 78.

Since the anode voltage has been reduced below the extinguishing potential, tube 78 will cease conducting and the current will become commutated to the next tube 79 with which is associated resistor 94.

At the next impulse across the points 76 and 77 tube 81 will be fired and condenser 88 will render the tube 79 non-conducting. At the next sync impulse across the points 76—77 tube 78 will be fired and condenser 89 will arrest the conducting action in tube 81.

Since the Kerr cells 91, 92, and 93 are connected across the several resistors 83, 94, and 95 they will be impressed with electrostatic charges across their electrodes 96 and 97 coincident with the appearance of each potential drop across their related resistors at the rate of change which is governed by the stimuli or sync pulsations established at the circuit terminals 76 and 77.

While the present invention has been explained and described with reference to a particular embodiment and specifically indicated modes of operation, it will be understood, nevertheless that numerous modifications and variations are susceptible of being incorporated without departing from the essential spirit or scope thereof. Accordingly it is not intended to be limited by the precise language employed in the foregoing specifications nor by the particular features indicated in the accompanying drawings except as embodied in the appended claims.

I claim:

1. In a video system, apparatus for projecting an image in substantially parallel rays, a first plurality of light permeable reflectors spaced from each other and disposed in parallel oblique arrangement in the path of said rays whereby to divide said rays into a plurality of reflected paths, a second plurality of reflected paths, a second plurality of light permeable reflectors obliquely arranged in an alignment with each reflector disposed in one of said reflected paths, a color filter element for imparting a characteristic primary color to the image rays in its said path, a plurality of shutters one in each of said paths maintained normally shut, and a sequencing device for opening each shutter at a predetermined frequency and succession.

2. In a video system, apparatus for projecting an image in substantially parallel rays, a first plurality of light permeable reflectors spaced from each other and disposed in parallel oblique arrangement in the path of said rays whereby to divide said rays into a plurality of reflected paths, a second plurality of reflected paths, a second plurality of light permeable reflectors obliquely arranged in alignment with each reflector disposed in one of said reflected paths, means for color filtering the light rays in each of said reflected paths whereby to pass light rays of a characteristic primary color, a plurality of electronic shutters one in each of said paths maintained normally shut, and a sequencing device for opening each shutter at a predetermined frequency and in a predetermined succession.

3. In a video coloration system, apparatus for projecting an object field in substantially parallel rays, a first plurality of light permeable reflectors predeterminately spaced from each other and disposed in parallel oblique arrangement in the path of said rays whereby to divide said rays into a plurality of reflected paths, a second plurality of light permeable reflectors obliquely arranged in alignment with each reflector disposed in one of said reflected paths so as to realign said rays onto a common target, a color filter element for imparting a different primary color to the image rays in each said paths, a plurality of electrostatically operable shutters one in each of said paths maintained normally shut, and an electronic sequencing device for opening each shutter in a predetermined frequency and succession by distributing an operating impulse thereto at a video signal frequency.

4. A system of video coloration which comprises, a lens system projecting an image field along a principal parallel-ray path, a plurality of light dividing mirrors arranged in oblique parallelism in said principal-ray path to generate by reflection a plurality of perpendicular secondary paths, a plurality of primary color system filters located one each in said secondary paths, a pair of polaroid screens in each of said secondary paths spaced from each other and arranged in light barring intersection to each other, electrostatically responsive light-ray rotating cells disposed between each of said pairs of polaroid screens, a plurality of light collecting reflectors disposed one each in said secondary paths for redirecting the divided image paths thereof onto a common field, and a sequencing apparatus comprising a chain circuit arrangement of electron valves fired by a video frequency synchronizing impulse to condition each of said cells successively for enabling said cells to rotate their secondary path light rays to pass the polaroid screens.

5. Apparatus for colored picture transmission comprising, a lens system for projecting an image field along a principal parallel ray path, a series of light dividing mirrors arranged in oblique parallelism to generate by reflection from said principal path a series of secondary paths, different primary color filters located one each in said secondary paths, a pair of polaroid barriers in each secondary path spaced from each other in light barring intersection, Kerr effect cells disposed between each of said pairs of polaroid barriers, a series of reflectors disposed one each in said secondary paths for redirecting the divided rays thereof onto a common field, and a sequencing apparatus comprising electron valves fired by a video synchronizing impulse to progressively condition each of said Kerr effect cells for enabling said cells to rotate its secondary path light rays to pass its polaroid screens.

6. In a video color system, a transmitting station, a receiving station, antennae for aerial signal communication between said transmitting and receiving stations, means at said transmitting station for projecting light-rays depicting an object field, a series of light penetrable reflectors angularly positioned in the path of said light-rays to reflect object images along a series of lateral paths, means for color separating the light rays in each said lateral path, light shutters in each of said lateral paths for selectively passing light-rays thereover, collector mirrors for re-assembling said lateral path light-rays on a video camera tube, a video scanning circuit for generating signals according to the collected light-rays, a synchronizing circuit for superimposing aligning impulses on said ether signals and for cycling said Kerr cells, a picture tube at said receiving station means for projecting said picture tube image, a series of light penetrable reflectors angularly positioned in the path of said picture tube light-rays to reflect object images along a series of lateral paths, means for coloring the light-rays in said lateral paths according to different primary colors, Kerr cells and polaroid screens for selectively passing or barring the light-rays in said lateral paths, collector mirrors for re-assembling said lateral path rays passed by said light shutters on to a viewing target, and a synchronizing circuit responsive to the synchronizing impulses superimposed on said ether signals by said transmitting station synchronizing circuit for timing the operation of said Kerr cells in said receiving station lateral paths.

References Cited in the file of this patent

UNITED STATES PATENTS

| | | |
|---|---|---|
| 2,109,540 | Leishman | Mar. 1, 1938 |
| 2,335,180 | Goldsmith | Nov. 23, 1943 |
| 2,350,892 | Hewson | June 6, 1944 |